April 3, 1928.

H. H. WERMINE 1,664,840

APPARATUS FOR STANDARDIZING SOLUTIONS

Original Filed May 14 1925    2 Sheets-Sheet 1

Inventor
Hugo H. Wermine.
Fisher Towle Clapp + Soans Attys.

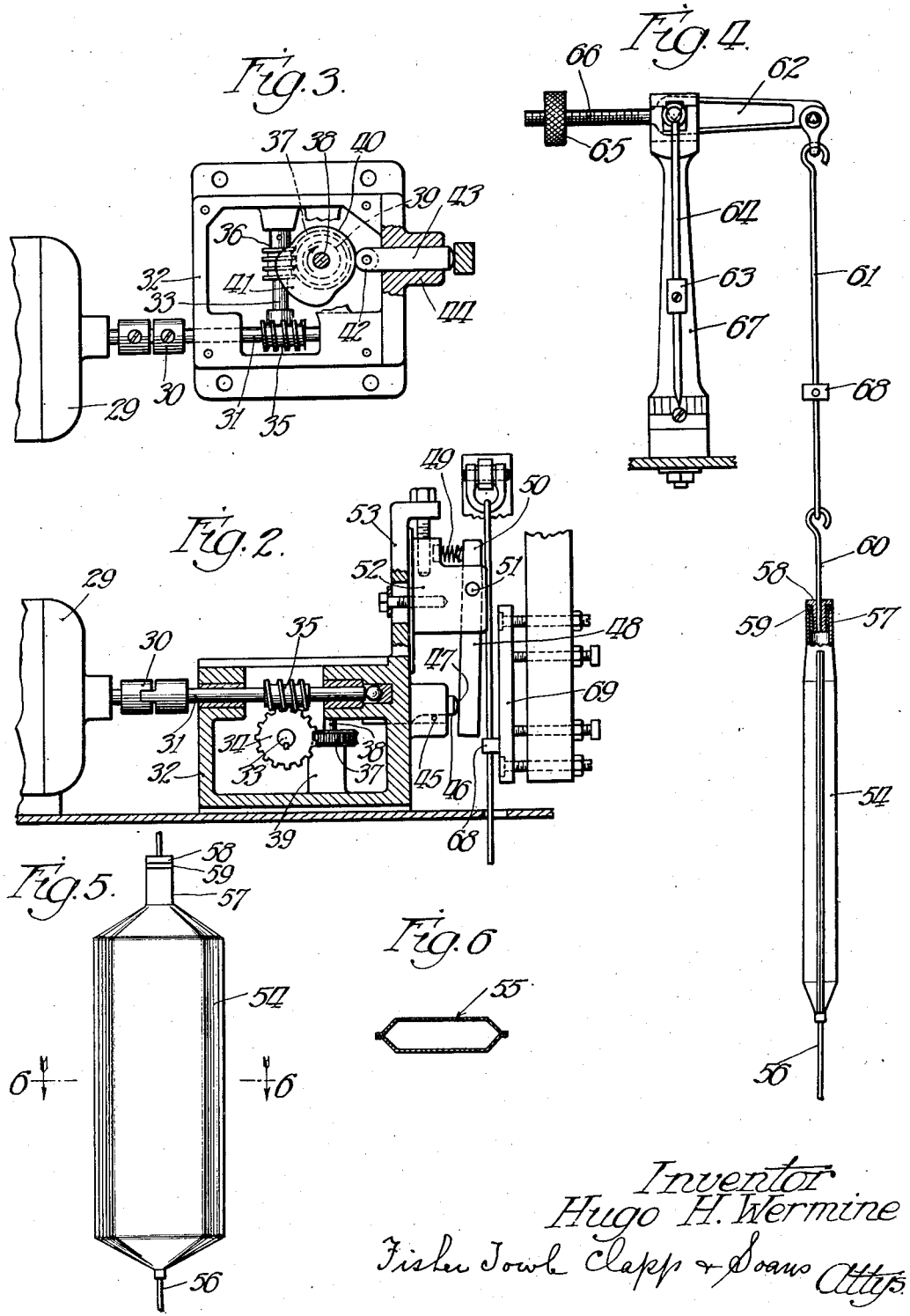

Patented Apr. 3, 1928.

1,664,840

UNITED STATES PATENT OFFICE.

HUGO H. WERMINE, OF VILLA PARK, ILLINOIS, ASSIGNOR TO BELDEN MANUFACTURING COMPANY, OF CHICAGO, ILLINOIS, A CORPORATION OF ILLINOIS.

APPARATUS FOR STANDARDIZING SOLUTIONS.

Application filed May 14, 1925, Serial No. 30,214. Renewed February 23, 1928.

My invention relates to apparatus for standardizing solutions and is of particular value in meeting conditions where the temperature of the solution in question cannot be maintained constant.

In a co-pending application, I have described a system and apparatus for regulating the density of solutions by means of a hydrometric float or buoy submerged in the solution. In such a system, the rise and fall of the hydrometric element in the solution due to change in the density of the liquid, controls a valve mechanism by which there is admitted to the solution a liquid of a different density so as to correct the change in density which has occurred and which caused the movement of the hydrometric element.

It is well known that, as compared with solids, all liquids have a relatively high coefficient of expansion due to temperature. Therefore, where a float or buoy of ordinary construction is used as the hydrometric element, it will be found that due to the relatively great change in specific gravity of the liquid, due to its high temperature expansion co-efficient as compared with the relatively low temperature expansion co-efficient for the buoy itself, the solution, although automatically maintained at substantially constant specific gravity, will not contain the same percentages of its constituents or ingredients at different temperatures. That is to say, with my previously described apparatus, the composition of the liquid will be found to vary slightly with the temperature. Under ordinary circumstances, in some cases where the temperature is not subject to wide variations, such change in composition is not vital or serious, but where the liquid is used for coating purposes and where the final thickness of the coating is a material factor in the quality or saleablity of the finished product, such variations in composition may be of considerable importance.

Hence, it will be understood that the primary object of my invention is to provide an apparatus by which the composition of the solution may be maintained substantially uniform, even though its temperature and specific gravity may change.

In describing my invention, I will use as an illustration, the general type of apparatus such as is disclosed in my co-pending application, to which I have previously referred. In the drawings which accompany this application and which illustrate such an apparatus, Fig. 1 is an elevation partly in section, showing the apparatus as a whole.

Fig. 2 is an elevation partly in section, of a portion of the hydrometrically controlled mechanism.

Fig. 3 is a plan view of part of the apparatus shown in Fig. 2.

Fig. 4 is an elevation of the float and its balancing means.

Fig. 5 is a broad side elevation of the float, and

Fig. 6 is a section taken on the line 6—6 of Fig. 5.

Figure 1:
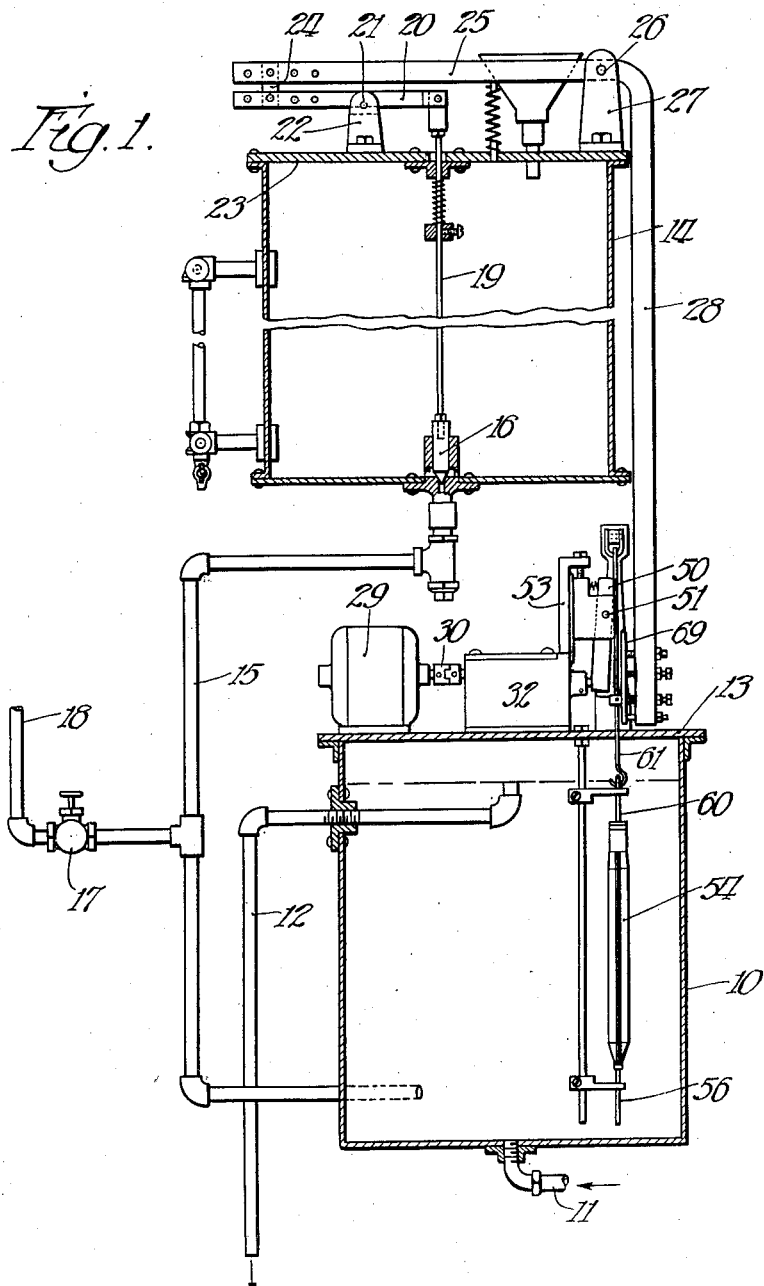

Referring to the apparatus and particularly Fig. 1, 10 is a tank through which is circulated a coating solution or other liquid which is being standardized or regulated. Such liquid enters the tank at the bottom through pipe 11 and is discharged through an overflow pipe 12. Said tank 10 is provided with a stout cover 13 on which the major portion of the regulating apparatus is mounted or supported.

In the present instance, I have shown an apparatus adapted for use in those cases where the liquid contains a volatile solvent, the continual evaporation of which from the solution tends to cause the solution constantly to increase in density or specific gravity. Therefore, it is necessary to keep adding, from time to time, a sufficient quantity of thinner or solvent to maintain the composition of the solution substantially constant. Such thinner or volatile solvent is contained in a tank 14 elevated above the tank 10 so that the thinner may descend into the mixing tank by gravity through pipe 15 when the valve 16 is open. In order to replenish the supply of liquid as it is used up, I also provide a valve 17 in pipe 18 which communicates with a supply of previously standardized or of concentrated solution.

The valve 16, which may be of any suitable construction, is opened by lifting upon the rod 19, which rod is pivotally connected to the inner end of a lever 20 fulcrumed on an axially horizontal pin 21, supported in a bracket 22 on the cover 23 of the solvent tank 14.

The outer end of the lever 20 is adjustably connected by a suitable link 24 to the horizontal arm 25 of a bell crank lever journalled on an axially horizontal pin 26 carried in a bracket 27, also mounted on the tank cover 23. The vertical arm 28 of the bell crank lever extends downwardly to the hydrometrically controlled actuating mechanism which is supported on the cover 13 of tank 10.

Such actuating mechanism includes an electric motor 29 or other constantly driven member which, through a coupling 30, drives a horizontal shaft 31 journalled in bearings forming parts of a gear housing 32. Said gear housing 32 is also made with bearings for rotatably supporting a horizontal cross shaft 33 on which is keyed a worm gear 34. Said worm gear meshes with a worm 35 keyed to the shaft 31 intermediate its bearings so that shaft 33 will be driven constantly at a reduced speed.

Said cross shaft 33 also carries a worm 36 which meshes with a worm gear 37 carried by a short vertical cam shaft 38 journalled in the vertical boss 39 on the floor of the gear housing 32. To said vertical cam shaft 38 there is keyed a radial cam 39 shown best in Fig. 3.

The major portion 40 of the surface of said radial cam is concentric with the shaft 38 and the remaining portion 41 is elevated and serves to engage a roller 42 journalled in the end of a reciprocatory plunger 43 slidably mounted in a horizontally extending boss 44 forming a part of the gear housing.

The axis of the roller 42 is maintained vertical by means of a small pin 45 co-operating with a flat portion 46 formed on the underside of the plunger 43. The rounded outer end 47 of the reciprocating plunger 43 is always engaged by the side of the lower end of a depending arm 48, said arm 48 being caused always to follow the movement of the plunger 43 by a compression spring 49 which pushes outwardly upon the upper end 50 of the said lever 48. Said lever 48 is mounted to rock on a horizontal pin 51 mounted in a block 52 adjustably supported by a rigid standard 53 extending upwardly from the gear housing.

The hydrometric element comprises a float or buoy of special construction. As shown in Figs. 4, 5 and 6, instead of employing a conventionally shaped buoy in the form of a sphere or cylinder, my special float is made in the shape of a flattened capsule, the width of which is a plurality of times greater than its thickness. Preferably, said capsule 54 is made of quite thin incorrodible material such as sheet copper or brass, so that pressure applied to the inside or outside of the capsule will result in a collapsing or a distention of its side walls 55.

The lower end of the capsule is guided by a vertical rod 56 and the upper end is fitted with a filling neck 57 closed or sealed by a cork element 58 which may take the form of a suitably threaded plug co-operating with a gasket 59. The plug 58 is also fitted with a suspension rod 60, the upper end of which is hooked into the lower end of an upper suspension wire or rod 61. The elastic sided collapsible capsule 54 is preferably filled with a liquid which has a temperature co-efficient of expansion of substantially the same value as that of the liquid or solution which is being standardized, contained in the tank 10. Ordinarily, I prefer to fill the capsule with a quantity of the solution itself.

The hydrometric element which is obviously somewhat heavier than the liquid which it displaces, is hung from the end of one arm 62 of the scale beam or balance, the sensitiveness of which can be adjusted by sliding weight 63 up or down the depending pointer 64. Balancing of the float to provide any desired specific gravity or density for the solution, is effected by moving the counter-weight 65 along the opposite arm 66 of the scale beam. To facilitate such adjustment the counterweight 65 takes the form of a knurled nut, the arm 66 being correspondingly threaded.

The standard 67 which supports the scale beam is bolted to the cover 13 of tank 10 in such position that a small block 68 fixed on the wire 61 will be engaged and moved outwardly by the lever 48 when the rise of the float elevates the upper edge of the block 68 above the lower edge of the swinging arm 48.

On the lower end of the depending arm 28 of the bell crank, I adjustably mount a face plate 69, the position of which is such that when the block 68 rises into position to be engaged by the reciprocating arm 48, the face plate 69 will be moved outwardly a substantial distance and thus the valve 16 will be opened to admit thinner into the tank 10.

It will be understood that the reciprocatory movement of the plunger 43 is relatively slow, the cam shaft 38 revolving only a few times per minute, so that even though there be a very slight elevation of the hydrometric element due to a relative increase in specific gravity of the liquid, there will be plenty of time for the block 68 to assume a position where it will cause the valve mechanism to become effective. Normally when the block 68 is below the end of the lever 48, the lever 48 moves idly back and forth since the stroke of the plunger is not sufficient to effect direct contact between the lower end of arm 48 and the actuating face plate 69 of the bell crank lever.

It will be observed that I have used the term "relative increase in specific gravity". The reason for this is because, with the collapsible capsule such as I employ for a hydrometric element, the displacement of the capsule will vary with the temperature and its specific gravity will correspondingly vary. If the temperature alone varies while the composition or relative proportions of the ingredients of the solution remains constant, there will obviously be no tendency for the hydrometric element to rise in the solution and the valve 16 will remain closed. It is only when the composition of the solution changes, due to evaporation of solvent, that the hydrometric element will rise and become effective to actuate the valve and admit new solvent to the solution.

The described details of construction and operation being illustrative of but one specific application of my invention, it will be understood that the scope of the same should be determined by reference to the appended claims, said claims being construed as broadly as possible consistent with the state of the art.

I claim as my invention:

1. In a system for regulating the composition of a solution, the combination of a member submerged in said solution and having a relatively high temperature co-efficient of expansion as compared with a solid body, and means controlled by the buoyancy of said member for supplying said solution with liquid of a different composition to compensate for changes in such composition.

2. In a system for regulating the composition of a solution, the combination of a hydrometric element submerged in said solution and expansible by heat to substantially the same extent as the solution itself, and means controlled by the buoyancy of said element for supplying solvent to said solution to compensate for loss of solvent due to evaporation.

3. In a system for regulating the composition of a solution, the combination of a hollow readily collapsible member submerged in said solution, a filling for said member having a temperature co-efficient of expansion relatively much greater than that of the solid material of which the wall of said member is composed and means controlled by the buoyancy of said member for adding to said solution liquid of a different composition to compensate for changes in the composition of said solution.

4. In a system for regulating the composition of a solution, the combination of a member comprising a sealed elastic container submerged in said solution, a liquid filler for said container having substantially the same temperature expansion co-efficient as the solution itself and means controlled by the buoyancy of said member for supplying solvent to said solution to compensate for evaporation of solvent.

HUGO H. WERMINE.